(12) United States Patent
Zhao et al.

(10) Patent No.: US 12,096,355 B2
(45) Date of Patent: Sep. 17, 2024

(54) AMENDED VERSION CLEANPOWER ADJUSTMENT METHOD AND ACCESS NETWORK DEVICE

(71) Applicant: HUAWEI TECHNOLOGIES CO., LTD., Shenzhen (CN)

(72) Inventors: Jing Zhao, Shenzhen (CN); Lin Liu, Shanghai (CN); Yifan Wang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 337 days.

(21) Appl. No.: 17/730,794

(22) Filed: Apr. 27, 2022

(65) Prior Publication Data

US 2022/0256454 A1    Aug. 11, 2022

Related U.S. Application Data

(63) Continuation of application No. PCT/CN2020/124504, filed on Oct. 28, 2020.

(30) Foreign Application Priority Data

Oct. 29, 2019   (CN) .......................... 201911038422.7

(51) Int. Cl.
*H04W 52/18* (2009.01)
*H04W 52/02* (2009.01)

(52) U.S. Cl.
CPC ....... *H04W 52/0206* (2013.01); *H04W 52/18* (2013.01)

(58) Field of Classification Search
CPC ........................... H04W 52/0206; H04W 52/18
See application file for complete search history.

(56) References Cited

U.S. PATENT DOCUMENTS 8,055,300 B2 * 11/2011 Andersson ........... H04B 7/0874
                                                        370/320
8,219,362 B2 *  7/2012 Shrivastava ....... H05K 7/20836
                                                        703/2

(Continued)

FOREIGN PATENT DOCUMENTS

CN      102771165 A    11/2012
CN      103686973 A     3/2014

(Continued)

OTHER PUBLICATIONS

Nec, Discussion on evaluation issues for new Rat. 3GPP TSG RAN WG1 Meeting #84bis, Busan, South Korea, 11 Apr. 15, 2016, R1-162427, 2 pages.

(Continued)

*Primary Examiner* — Hai V Nguyen
(74) *Attorney, Agent, or Firm* — HAUPTMAN HAM, LLP

(57) ABSTRACT

Embodiments provide a power adjustment method and an access network device, and the embodiments relate to the field of communication technologies. A target power increase value is adaptively determined based on a target key characteristic of a target cell, so that a cell coverage loss and a cell capacity loss caused by channel shutdown are compensated for, and a good energy-saving effect is obtained. The access network device blocks transmit channels that are of some of a plurality of antennas and that correspond to the target cell. Then, the access network device obtains the target key characteristic of the target cell, and determines the target power increase value based on the target key characteristic. The access network device increases, based on the target power increase value, transmit power of the access network device corresponding to the target cell or a target user.

20 Claims, 7 Drawing Sheets

(56) References Cited

U.S. PATENT DOCUMENTS

| | | | | |
|---|---|---|---|---|
| 8,639,482 | B2* | 1/2014 | Rasmussen | G06F 1/26 |
| | | | | 703/5 |
| 8,972,217 | B2* | 3/2015 | VanGilder | G06F 30/20 |
| | | | | 702/136 |
| 9,519,517 | B2* | 12/2016 | Dalgas | H04L 67/1008 |
| 9,778,718 | B2* | 10/2017 | Zacho | G06F 1/3287 |
| 9,984,580 | B2* | 5/2018 | Liao | G08G 5/0043 |
| 9,996,659 | B2* | 6/2018 | Shrivastava | G06F 30/18 |
| 10,039,016 | B1* | 7/2018 | Larish | H04W 24/02 |
| 10,102,313 | B2* | 10/2018 | VanGilder | G06F 30/23 |
| 10,287,988 | B2* | 5/2019 | Asati | F01K 13/00 |
| 10,614,194 | B2* | 4/2020 | Shrivastava | H05K 7/20836 |
| 10,636,007 | B2* | 4/2020 | Runkana | G05B 15/02 |
| 10,817,033 | B2* | 10/2020 | VanGilder | G06F 30/13 |
| 11,044,650 | B2* | 6/2021 | Chen | H04W 72/046 |
| 11,076,507 | B2* | 7/2021 | Morgan | G06Q 10/06313 |
| 11,159,987 | B2* | 10/2021 | Thaliath | H04W 24/02 |
| 11,240,103 | B2* | 2/2022 | Chi | H04W 24/02 |
| 11,399,303 | B2* | 7/2022 | Bedekar | H04W 8/24 |
| 11,418,270 | B2* | 8/2022 | Veijalainen | H04B 17/29 |
| 11,503,744 | B2* | 11/2022 | Morgan | H01H 21/24 |
| 11,570,063 | B2* | 1/2023 | Lee | H04L 41/5019 |
| 11,743,102 | B1* | 8/2023 | Gatherer | H04W 88/18 |
| | | | | 455/418 |
| 11,765,654 | B2* | 9/2023 | Singh | G06N 3/092 |
| | | | | 370/318 |
| 11,799,733 | B2* | 10/2023 | Uskudar | H04L 41/16 |
| 11,882,460 | B2* | 1/2024 | Zhang | H04L 41/147 |
| 2009/0061939 | A1* | 3/2009 | Andersson | H04B 7/082 |
| | | | | 455/562.1 |
| 2010/0287018 | A1* | 11/2010 | Shrivastava | G06F 30/18 |
| | | | | 703/1 |
| 2012/0315948 | A1* | 12/2012 | Frenger | H04W 52/343 |
| | | | | 455/522 |
| 2013/0046514 | A1* | 2/2013 | Shrivastava | G06F 30/18 |
| | | | | 703/1 |
| 2013/0100880 | A1 | 4/2013 | Moren et al. | |
| 2016/0233580 | A1 | 8/2016 | Aparin et al. | |
| 2016/0281607 | A1* | 9/2016 | Asati | F02C 7/26 |
| 2017/0126265 | A1 | 5/2017 | Black et al. | |
| 2017/0289920 | A1 | 10/2017 | Liu et al. | |
| 2018/0253518 | A1* | 9/2018 | Shrivastava | G06F 30/18 |
| 2018/0330300 | A1* | 11/2018 | Runkana | G05B 15/02 |
| 2019/0014488 | A1* | 1/2019 | Tan | G06N 3/044 |
| 2019/0364492 | A1* | 11/2019 | Azizi | H04W 52/0264 |
| 2020/0022040 | A1* | 1/2020 | Chen | H04W 72/046 |
| 2020/0293702 | A1* | 9/2020 | Shrivastava | G06F 30/18 |
| 2020/0366557 | A1* | 11/2020 | Chi | H04L 41/145 |
| 2020/0370994 | A1* | 11/2020 | Santarone | G01S 1/14 |
| 2021/0124382 | A1* | 4/2021 | Deka | H02M 3/1566 |
| 2021/0274403 | A1* | 9/2021 | Chen | H04W 36/0085 |
| 2021/0314365 | A1* | 10/2021 | Smith | H04L 63/20 |
| 2022/0021469 | A1* | 1/2022 | Veijalainen | H04B 17/29 |
| 2022/0286369 | A1* | 9/2022 | Lee | H04L 41/5009 |
| 2022/0311675 | A1* | 9/2022 | Uskudar | H04L 41/145 |
| 2023/0074288 | A1* | 3/2023 | Filippou | H04W 28/0236 |
| 2023/0135872 | A1* | 5/2023 | Singh | G06N 3/048 |
| | | | | 370/318 |
| 2023/0269606 | A1* | 8/2023 | Säily | H04W 24/02 |
| | | | | 455/67.11 |
| 2023/0318904 | A1* | 10/2023 | Gatherer | H04L 41/16 |
| | | | | 455/418 |
| 2023/0319707 | A1* | 10/2023 | Singh | G06N 3/048 |
| | | | | 370/318 |
| 2023/0325711 | A1* | 10/2023 | Haraldson | H04W 52/0245 |
| | | | | 706/12 |

FOREIGN PATENT DOCUMENTS

| | | |
|---|---|---|
| CN | 103906076 A | 7/2014 |
| CN | 103906203 A | 7/2014 |
| CN | 106453909 A | 2/2017 |
| CN | 106850023 A | 6/2017 |
| CN | 108234096 A | 6/2018 |
| CN | 109548124 A | 3/2019 |
| CN | 109709046 A | 5/2019 |
| EP | 2154793 A2 | 2/2010 |
| EP | 2161851 A1 | 3/2010 |
| WO | 2010137870 A2 | 12/2010 |
| WO | 2017212497 A1 | 12/2017 |
| WO | 2018117922 A1 | 6/2018 |
| WO | 2018217012 A1 | 11/2018 |

OTHER PUBLICATIONS

Chinese Office Action issued in corresponding Chinese Application No. 201911038422.7, dated Aug. 17, 2021, pp. 1-8.
Chinese Office Action issued in corresponding Chinese Application No. 201911038422.7, dated Mar. 9, 2022, pp. 1-17.
International Search Report issued in corresponding International Application No. PCT/CN2020/124504, dated Jan. 27, 2021, pp. 1-9.
Huang Jun et al:"Soft Power Saving of 5G-NR Base Station",Dec. 2019,total 5 pages.
Chinese Notice of Allowance issued in corresponding Chinese Application No. 201911038422.7, dated Jul. 28, 2023, pp. 1-5.
Extended European Search Report issued in corresponding European Application No. 20880976.4, dated Oct. 26, 2022, pp. 1-8.

* cited by examiner

AMENDED VERSION CLEANPOWER ADJUSTMENT METHOD AND ACCESS NETWORK DEVICE

CROSS-REFERENCE TO RELATED APPLICATIONS

This application is a continuation of International Application No. PCT/CN2020/124504, filed on Oct. 28, 2020, which claims priority to Chinese Patent Application No. 201911038422.7, filed on Oct. 29, 2019. The disclosures of the aforementioned applications are incorporated herein by reference in these entireties.

BACKGROUND

A multiple-input multiple-output (MIMO) technology is a technology in which a plurality of antennas is used at a transmit end and a receive end of an access network device, so that a signal is transmitted and received by using the plurality of antennas at the transmit end and the receive end. In this way, communication quality is improved. Through the MIMO technology, spatial resources are fully utilized, and signals are transmitted by using the plurality of antennas, so that spectral efficiency and cell coverage is effectively improved without increasing spectrum resources and antenna transmit power.

However, because the access network device uses the plurality of antennas, the MIMO technology also causes higher energy consumption, bringing a greater burden to an operator. In a cell covered by the access network device is less than a value threshold, the access network device reduces energy consumption of a MIMO system by blocking transmit channels (which is also referred to as channel shutdown) that are of some of the plurality of antennas and that correspond to the cell. Channel shutdown shrinks a coverage area of the cell, resulting in a coverage loss of the cell. In addition, channel shutdown reduces spectral efficiency of the cell, resulting in a capacity loss of the cell. Cell performance deteriorates due to the coverage loss and the capacity loss of the cell.

SUMMARY

Embodiments described herein provide a power adjustment method and an access network device, to improve spectral efficiency and cell coverage and compensate for a cell coverage loss and a cell capacity loss caused by channel shutdown. In this way, a good energy-saving effect is obtained while cell performance is ensured.

To achieve the foregoing objective, the following technical solutions are used in embodiments described herein.

According to an aspect, an embodiment provides a power adjustment method. The method includes: An access network device blocks transmit channels that are of some of a plurality of antennas and that correspond to a target cell. Then, the access network device obtains a target key characteristic of the target cell, and determines a target power increase value based on the target key characteristic. The access network device increases, based on the target power increase value, transmit power of the access network device corresponding to the target cell or a target user.

The target key characteristic includes at least one of cell load, a cell service volume, or cell user distribution. The target user is a user in the target cell.

In this solution, after the channels are blocked, the access network device adaptively determines the target power increase value based on the target key characteristic of the target cell, and increase, based on the determined target power increase value, the transmit power of the access network device corresponding to the target cell or the target user, so that spectral efficiency and cell coverage is improved, and a cell coverage loss and a cell capacity loss caused by channel shutdown is compensated for. Therefore, based on the solution, the access network device obtains a better energy-saving effect while ensuring cell performance.

In at least one embodiment, the access network device increases, based on the target power increase value, transmit power of the access network device corresponding to the target cell or a target user includes: The access network device increases, based on the target power increase value, transmit power of a target resource block RB used by the access network device corresponding to the target cell; the access network device increases, based on the target power increase value, transmit power of resource blocks RBs of the access network device corresponding to the target cell; or the access network device increases, based on the target power increase value, transmit power of a resource block RB of the access network device corresponding to the target user in the target cell.

That is, the access network device increases, based on the target power increase value, transmit powers of different resource blocks RBs of the access network device corresponding to the target cell or the target user.

In at least one embodiment, the access network device determines a target power increase value based on the target key characteristic includes: The access network device inputs the target key characteristic into an algorithm model in the access network device; and then the access network device determines the target power increase value based on an output of the algorithm model.

In this solution, the access network device determines the target power increase value by using the algorithm model based on the target key characteristic of the target cell.

In at least one embodiment, before that the access network device obtains a target key characteristic of the target cell, the method further includes: The access network device adjusts a reference power increase value of a reference cell for a plurality of times, and increases, based on the reference power increase value, transmit power of the access network device corresponding to the reference cell. Then, the access network device obtains a reference key characteristic of the reference cell and a reference key performance indicator (KPI) of the reference cell in an adjustment time period, and determines a reference change label based on the reference KPI and a baseline value, where the reference change label is used to indicate whether a power increase value is appropriate. The access network device inputs the reference key characteristic, the reference power increase value, and the reference change label into the algorithm model, and obtains a relational model of a key characteristic, the power increase value, and a change label from the algorithm model through learning.

The reference KPI includes at least one of a throughput, a call drop rate, or saved energy. The baseline value is a preset value, and is used to represent a quantized value of a KPI corresponding to a power increase value used by the access network device to compensate for a cell performance loss after the channel is blocked.

That is, the access network device trains the algorithm model by inputting the reference key characteristic, the reference power increase value, and the reference change label into the algorithm model, to obtain the relational model of the key characteristic, the power increase value, and the change label. Subsequently, the target power increase value corresponding to the key characteristic of the target cell is obtained based on the algorithm model.

In at least one embodiment, that the access network device adjusts a power increase value of a cell for a plurality of times includes: The access network device decreases the power increase value from a first preset value at a preset step until the power increase value is a second preset value, and then repeats the process, or the access network device increases the power increase value from the second preset value at the preset step until the power increase value is the first preset value, and then repeats the process.

That is, the access network device adjusts the power increase value corresponding to the cell in a manner of decreasing or increasing the power increase value gradually. Subsequently, changes in the cell performance caused by different power increase values are analyzed, to seek a power increase value that balances the cell performance and the energy-saving effect.

In at least one embodiment, the access network device reserves a dataset, and the dataset includes a plurality of groups of reference key characteristics, reference power increase values, and reference change labels that are obtained before the target key characteristic is obtained; and after that the access network device obtains a relational model of a key characteristic, the power increase value, and a change label from the algorithm model through learning, the method further includes: The access network device evaluates availability of the algorithm model by using the dataset.

In other words, the access network device reserves, as the dataset, some of the plurality of groups of reference key characteristics, reference power increase values, and reference change labels that are obtained before the target key characteristic is obtained, and evaluate the availability of the algorithm model based on the dataset.

In at least one embodiment, that the access network device determines a reference change label based on the reference KPI and a baseline value includes: The access network device calculates a comparison value of a quantized value of the reference KPI and the baseline value; and in response to the comparison value exceeding a threshold, the access network device determines that the reference change label is a first change label, where the first change label is used to indicate that the reference power increase value is inappropriate; or in response to the comparison value not exceeding the threshold, the access network device determines that the reference change label is a second change label, where the second change label is used to indicate that the reference power increase value is appropriate.

The quantized value of the reference KPI is a largest value among reference KPIs; the quantized value of the reference KPI is a smallest value among reference KPIs; or the quantized value of the reference KPI is an average value of the reference KPIs.

The comparison value of the quantized value of the reference KPI and the baseline value include: a difference between the quantized value of the reference KPI and the baseline value; an absolute value of the difference between the quantized value of the reference KPI and the baseline value; or a ratio of the quantized value of the reference KPI to the baseline value.

That is, in response to the comparison value of the quantized value of the reference KPI and the baseline value exceeding the threshold, the reference power increase value cannot well compensate for reference cell performance, the reference cell performance deteriorates, and therefore the reference power increase value is inappropriate. In response to the comparison value of the quantized value of the reference KPI and the baseline value not exceeding the threshold, the reference power increase value compensates for the reference cell performance, deterioration of the reference cell performance falls within an acceptable range, and therefore the reference power increase value is appropriate.

In at least one embodiment, the output of the algorithm model is the change label; and that the access network device determines the target power increase value based on an output of the algorithm model includes: The access network device determines a smallest power increase value among power increase values corresponding to the second change label, where the smallest power increase value is the target power increase value.

That is, the access network device determines, as the target power increase value based on the change label output by the algorithm model, a smallest power increase value among power increase values corresponding to the change label that indicates an appropriate power increase value.

In at least one embodiment, the algorithm model includes a correspondence among a plurality of groups of key characteristics and power increase values of cells, and benefits are obtained in response to the access network device using the power increase values. The algorithm model is used to learn a relational model between the key characteristic and a first power increase value, and the first power increase value is a power increase value that has a largest benefit and that corresponds to the key characteristic.

In other words, the access network device determines, based on the algorithm model, the first power increase value that corresponds to the target key characteristic of the target cell and that has a largest benefit, that is, the target power increase value.

In at least one embodiment, after that the access network device increases, based on the target power increase value, transmit power of a target resource block RB, the method further includes: The access network device obtains a target KPI corresponding to the target cell in a preset time period. Then, the access network device updates, to the algorithm model, a correspondence among the target key characteristic, the target KPI, the target power increase value, and a target benefit corresponding to the target cell, where the target benefit is a benefit obtained based on the target KPI, the target power increase value, and a baseline value. The access network device adjusts the relational model based on the updated algorithm model.

In other words, the access network device determines, by using the algorithm model, the target power increase value corresponding to the key characteristic of the target cell, and the access network device updates, to the algorithm model, the correspondence among the target key characteristic, the target KPI, the target power increase value, and the target benefit corresponding to the target cell, and adjusts the relational model. In this way, the access network device updates the algorithm model and adjusts the relational model. Therefore, the power increase value determined based on the algorithm model is more accurate.

In at least one embodiment, in response to a comparison value of a quantized value of the target KPI and the baseline value not exceeding a threshold, the benefit is a difference between a preset power increase value and the target power increase value.

In other words, in response to the comparison value of the quantized value of the target KPI and the baseline value not exceeding the threshold, the target power increase value meets a performance compensation used by the cell, and saves energy.

In at least one embodiment, in response to the access network device blocking transmit channels that are of half of the plurality of antennas and that correspond to the target cell, the baseline value is a quantized value of a KPI and the power increase value is 6 dB.

In other words, in response to the access network device blocking the transmit channels that are of half of the plurality of antennas and that correspond to the target cell, the baseline value is the quantized value of the KPI corresponding to the power increase value that compensates for a performance loss of the cell.

According to another aspect, this technical solution provides a power adjustment apparatus. The apparatus is included in an access network device, and the apparatus has a function of implementing behavior of the access network device in the foregoing aspect embodiments of the foregoing aspect. The function is implemented by using hardware, or is implemented by hardware executing corresponding software. The hardware or the software includes one or more modules or units corresponding to the foregoing functions, for example, a detection module or unit, and a display module or unit.

According to another aspect, this technical solution provides an access network device, including one or more processors, a memory, a plurality of application programs, and one or more computer programs, where the one or more computer programs are stored in the memory, and the one or more computer programs include instructions. Instructions are executed by the access network device and the access network device is enabled to perform the power adjustment method in one of the foregoing aspects.

According to another aspect, this technical solution provides a computer-readable storage medium, including computer instructions. The computer instructions are run on an access network device and the access network device is enabled to perform the power adjustment method in one of the foregoing aspects.

According to another aspect, this technical solution provides a computer program product. The computer program product runs on an access network device and the access network device is enabled to perform the power adjustment method in the foregoing embodiments.

DESCRIPTION OF EMBODIMENTS

The following describes technical solutions in embodiments with reference to the accompanying drawings in embodiments. In descriptions of embodiments, unless otherwise specified, "/" means "or". For example, A/B represents A or B. Herein, "and/or" describes an association relationship between associated objects and represents that three relationships exist. For example, A and/or B represents the following three cases: Only A exists, both A and B exist, and only B exists. In addition, in the descriptions in embodiments, "a plurality of" means two or more.

An embodiment provides a power adjustment method. The method is applied to an access network device. After the access network device blocks transmit channels that are of some antennas and that correspond to a target cell, the access network device adaptively determines a target power increase value based on a target key characteristic of the target cell. Then, the access network device increases, based on the target power increase value, transmit power of the access network device corresponding to the target cell or a target user, to improve spectral efficiency and cell coverage and compensate for a cell coverage loss and a cell capacity loss caused by channel shutdown. In this way, a better energy-saving effect is obtained while ensuring cell performance.

For example, the access network device includes but is not limited to, a next generation base station (gNodeB, gNB) in 5G, an evolved NodeB (eNB), a radio network controller (RNC), a NodeB (NB), a base station controller (BSC), a base transceiver station (BTS), a home base station (for example, a home evolved NodeB, or a home NodeB, HNB), a baseband unit (BBU), a transmission point (TRP), and a transmission point (TP), or a mobile switching center.

Figure 1:
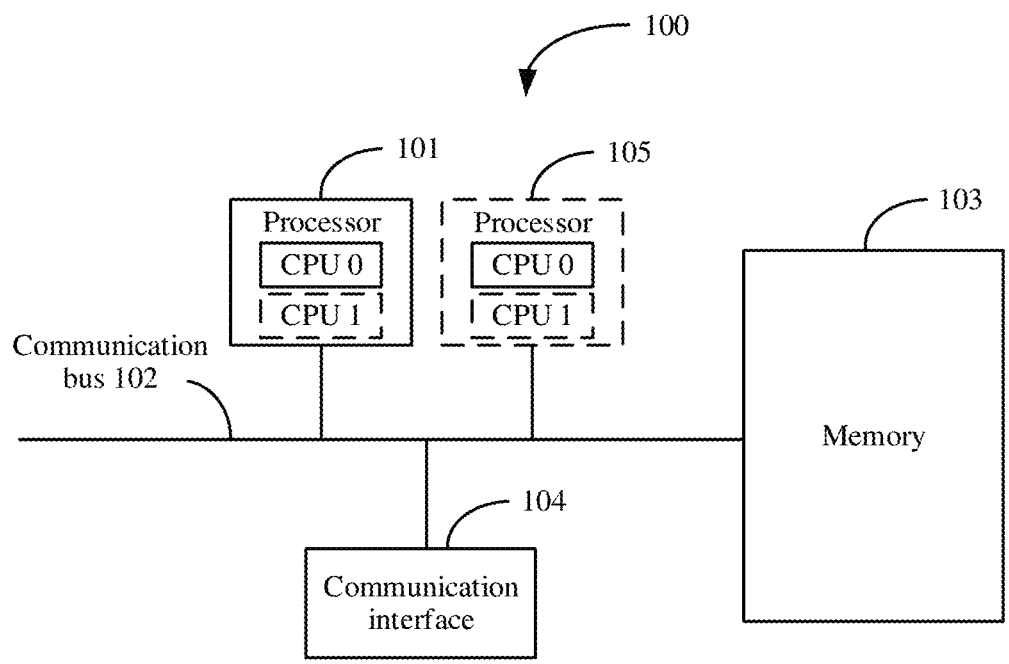
FIG. 1 is a schematic diagram of a hardware structure of an access network device according to an embodiment.

For example, the access network device uses a computer system. Refer to FIG. 1. A computer system 100 includes at least one processor 101, a communication bus 102, a memory 103, and at least one communication interface 104.

The processor 101 is a general-purpose central processing unit (CPU), a microprocessor, an application-specific integrated circuit (ASIC), or one or more integrated circuits configured to control program execution of the solutions described in at least one embodiment.

The communication bus 102 includes a channel for information transmission between the foregoing components.

The communication interface 104 is any apparatus such as a transceiver, and is configured to communicate with another device or a communication network, for example, the Ethernet, a radio access network (RAN), or a wireless local area network (WLAN).

The memory 103 is a read-only memory (ROM) or another type of static storage device that stores static information and instructions, or a RAM or another type of dynamic storage device that stores information and instructions, or is an electrically erasable programmable read-only memory (EEPROM), a compact disc read-only memory (CD-ROM) or another optical disc storage, an optical disc storage (including a compressed optical disc, a laser disc, an optical disc, a digital versatile disc, a Blu-ray optical disc, or the like), or a magnetic storage medium or another magnetic storage device, or any other medium that is used to carry or store expected program code in a form of instructions or a data structure and that is accessed by a computer. This is not limited thereto. The memory exists independently, and is connected to the processor by using the bus. Alternatively, the memory is integrated with the processor.

The memory 103 is configured to store application program code for executing the solutions described in at least one embodiment, and the processor 101 controls the execution. The processor 101 is configured to execute the application program code stored in the memory 103, to control the computer system 100 to implement a power adjustment method provided in the following embodiments. Computer-executable instructions in this embodiment is also be referred to as application program code. This is not limited in this embodiment.

In at least one embodiment, the processor 101 includes one or more CPUs, for example, a CPU 0 and a CPU 1 in FIG. 1. A CPU supports a plurality of virtualized CPUs, and the virtualized CPU is also referred to as a VCPU.

In at least one embodiment, the computer system 100 includes a plurality of processors, for example, the processor 101 and the processor 105 in FIG. 1. A processor is a single-core (single-CPU) processor or a multi-core (multi-CPU) processor. The processor herein is one or more devices, circuits, and/or processing cores configured to process data (for example, computer program instructions).

The computer system 100 is a general-purpose communication device or a dedicated communication device. A type of the computer system 100 is not limited in this embodiment. The computer system 100 is a desktop computer, a portable computer, a network server, a personal digital assistant (PDA), a mobile phone, a tablet computer, a wireless terminal device, an embedded device, or a device having a structure similar to that in FIG. 1. Components in the computer system 100 is deployed in a same computer device, or is deployed in different computer devices located in a distributed system.

Figure 2:
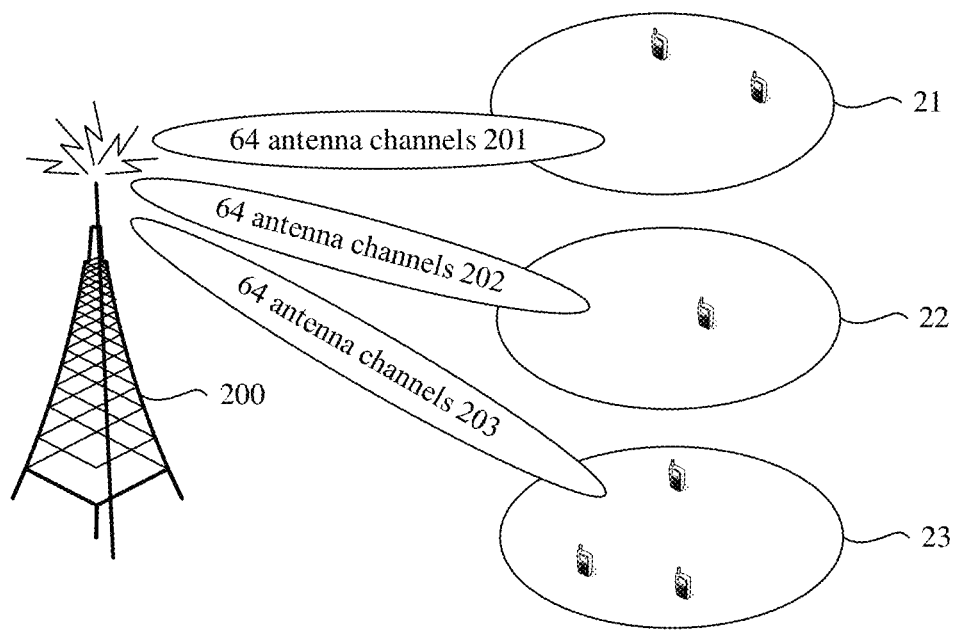
FIG. 2 is a schematic diagram of a structure of an access network device according to an embodiment.

In at least one embodiment, an access network device covers one or more cells. Refer to FIG. 2. For example, an access network device 200 covers three cells: a cell 21, a cell 22, and a cell 23. In addition, the access network device using a MIMO technology allocates a plurality of antennas to one or more cells. For example, 8, 16, 32, 64, 128, or 256 antennas are allocated to one or more cells. Refer to FIG. 2. The cell 21, the cell 22, and the cell 23 have 64 antenna channels 201, 64 antenna channels 202, and 64 antenna channels 203 respectively that correspond to the cell 21, the cell 22, and the cell 23. The access network device uses the MIMO technology to enable one or more cells to transmit signals by using the plurality of antennas. Transmissions of the plurality of antennas multiply a quantity of bits transmitted per unit of bandwidth. For example, one antenna transmits 1-bit data per unit of bandwidth, and 64 antennas transmit 64-bits data per unit of bandwidth, thereby effectively improving spectral efficiency. Beams transmitted by the plurality of antennas generate a large beam gain through beamforming, so that a signal is transmitted to a longer distance, and a coverage area of the cell is larger.

In addition, the access network device allocates a resource block RB to one or more cells, and the resource block RB corresponds to a system bandwidth. In a communication system, a larger quantity of resource blocks RBs indicates a wider system bandwidth.

The power adjustment method provided in this embodiment is used in a scenario in response to the cell load being less than a preset threshold, that is, where utilization of a resource block RB corresponding to the cell is less than the preset threshold, transmit channels that are of some of the plurality of antennas and that correspond to the cell are blocked (also referred to as channel shutdown), to reduce power consumption of the access network device. In response to the utilization of the resource block RB corresponding to the cell being less than the preset threshold, bandwidth utilization of the cell is low. There are few services in the cell. In this case, the access network device uses fewer antennas transmit channels to serve the cell. Therefore, enabling the transmit channels of the plurality of antennas allocated to the cell causes a waste of resources. In this way, power consumption of the access network device is reduced by blocking a channel. However, the channel shutdown reduces the spectral efficiency of the cell and causes a capacity loss and a cell coverage loss of the cell. As a result, the cell performance deteriorates.

According to the power adjustment method in some embodiments, after the transmit channel is blocked, the access network device increases, by using a fixed power increase value, transmit power of the access network device corresponding to the cell (also referred to as a fixed increase solution), to compensate for cell performance deterioration caused by the channel shutdown.

According to the power adjustment method in some other embodiments, after the transmit channel is blocked, the access network device adaptively determines a power increase value based on a key characteristic of the cell, and increase, based on the power increase value, transmit power of the access network device corresponding to the cell, so that cell performance deterioration caused by channel shutdown is compensated for. In addition, compared with the fixed power increase solution, large energy-saving benefits are obtained based on the adaptively determined power increase value. Therefore, energy-saving and the cell performance is ensured. In addition, the large energy-saving benefits are obtained while a cell coverage loss and a cell capacity loss caused by channel shutdown are compensated for.

Figure 3:
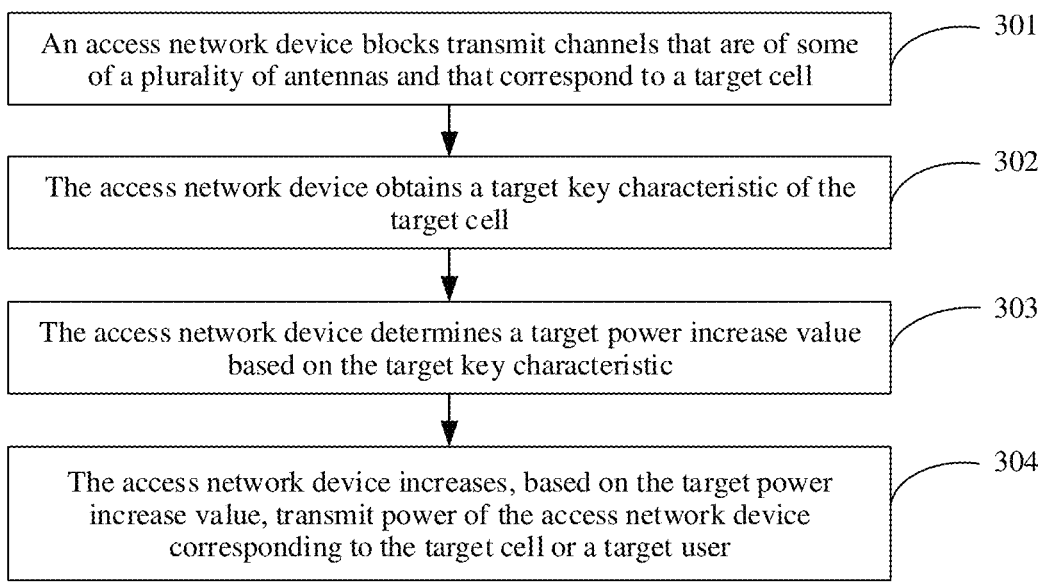
FIG. 3 is a flowchart of a power adjustment method according to an embodiment.

Refer to FIG. 3. A power adjustment method applied to an access network device according to an embodiment includes the following steps.

301. The access network device blocks transmit channels that are of some of a plurality of antennas and that correspond to a target cell.

The access network device covers a plurality of cells, and the access network device allocates a plurality of antennas to the plurality of cells. The target cell is one of the plurality of cells.

For example, in response to utilization of a resource block RB corresponding to the target cell being less than a preset threshold, the access network device blocks the transmit channels that are of some of the plurality of antennas and that correspond to the target cell, to reduce power consumption. For example, the preset threshold is one of be 5%, 6%, 8%, 10%, 15%, or 20%. A value of the preset threshold is not limited in this embodiment.

For example, in response to the utilization of the resource block RB corresponding to the target cell being less than 20%, the access network device blocks transmit channels that are of half of the plurality of antennas and that correspond to the target cell. For another example, in response to the utilization of the resource block RB corresponding to the target cell being less than 10%, the access network device blocks transmit channels that are of ⅔ of the plurality of antennas and that correspond to the target cell. A quantity of blocked transmit channels of the antennas is not limited in this embodiment, and the access network device determines a corresponding quantity of blocked transmit channels based on the utilization of the resource block RB corresponding to the target cell.

The following uses an example in which the access network device blocks the transmit channels that are of half of the plurality of antennas and that correspond to the target cell for description. In this case, because the transmit channels are halved, transmit power of the access network device is halved. In addition, a beam gain is also halved in response to transmission being performed by using the antennas. Therefore, a performance loss of the target cell caused by channel shutdown includes a sum of a power loss and a beam gain loss. In a communication system, a dB value is used to represent a change of a characteristic quantity. Refer to Formula 1 below. Formula 1 shows a relationship between the change of the characteristic quantity and a dB value corresponding to the characteristic quantity.

$$y=10 \lg (x) \tag{Formula 1}$$

x represents a change proportion of the characteristic quantity, and y represents a dB value corresponding to the change proportion of the characteristic quantity. For example, a characteristic quantity A is increased by 100 times, x is 100, and y=10 lg 100=20. That is, a change of the characteristic quantity A is 20 dB. For another example, a characteristic quantity B is decreased by a half, x is ½, and y=10 lg (½)≈−3. That is, a change of the characteristic quantity B is −3 dB.

Therefore, in response to the access network device blocks the transmit channels that are of half of the plurality of antennas and that correspond to the target cell, because the transmit power of the access network device is halved, the transmit power changes to −3 dB. In addition, because a beam gain is also halved during transmission performed by using the antennas, the beam gain also changes to −3 dB. Therefore, the performance change of the target cell caused by channel shutdown is −6 dB, that is, the cell performance deteriorates by 6 dB.

302. The access network device obtains a target key characteristic of the target cell.

The target key characteristic is used to indicate a basic condition of the target cell. The target key characteristic includes at least one of characteristics such as cell load, a cell service volume, or cell user distribution. For example, the cell load includes the utilization of the resource block RB corresponding to the cell. For example, the cell load is one 5%, 10%, 20%, 30%, 50%, or 80%. The cell service volume includes a volume of data transmitted in the cell in per unit of time. The cell user distribution includes a user quantity of the cell, a user type of the cell, and the like. The user type of the cell includes, for example, a proportion of cell center users and/or cell edge users.

303. The access network device determines a target power increase value based on the target key characteristic.

The target power increase value is an optimal power increase value that corresponds to the target cell and that is determined based on the target key characteristic.

In the power adjustment method provided in this embodiment, a mapping relationship is obtained through learning and training. The mapping relationship is used to indicate a relationship between a key characteristic of the cell and an optimal power increase value corresponding to the key characteristic of the cell. The access network device determines, based on the mapping relationship and target key characteristics of different target cells, different target power increase values corresponding to the different target cells. In other words, the access network device adaptively determines the target power increase value based on the target key characteristic of the target cell.

304. The access network device increases, based on the target power increase value, transmit power of the access network device corresponding to the target cell or a target user.

The target cell corresponds to a plurality of resource blocks RBs. There is a plurality of manners in which the access network device increases, based on the target power increase value, the transmit power of the access network device corresponding to the target cell or the target user. The manners are described below by using examples.

In some embodiments, the access network device increases, based on the target power increase value, transmit power of a target resource block RB used by the access network device corresponding to the target cell. For example, 10 resource blocks RBs of the target cell correspond to the access network device, and the access network device actually uses five resource blocks RBs. The target resource blocks RBs are five resource blocks RBs used by the access network device corresponding to the target cell. In this case, assuming that the access network device determines that the target power increase value is 5 dB, the access network device increases transmit power of the five resource blocks RBs used by the access network device corresponding to the target cell by 5 dB. From Formula 1, 5 dB corresponds to a change ratio of about 3.2 times the characteristic quantity. In other words, the access network device increases the transmit power of the five resource blocks RBs used by the access network device corresponding to the target cell by 3.2 times.

In some other embodiments, the access network device increases, based on the target power increase value, transmit power of resource blocks RBs of the access network device corresponding to the target cell.

In some other embodiments, the access network device increases, based on the target power increase value, transmit power of a resource block RB of the access network device corresponding to the target user in the target cell. For example, 100 resource blocks RBs of the target cell correspond to the access network device, there are 10 users in the target cell, and eight resource blocks RBs are allocated to a user 1. In this case, assuming that the access network device determines that the target power increase value is 5 dB, the access network device increases transmit power of the eight resource blocks RBs allocated to the user 1 by 5 dB.

In the solution described in step 301 to step 304, first, the access network device blocks the transmit channels that are of some of the plurality of antennas and that correspond to the target cell, and the access network device obtains the target key characteristic of the target cell. Then the access network device determines the target power increase value based on the target key characteristic. Finally, the access network device increases, based on the target power increase value, the transmit power of the access network device corresponding to the target cell or the target user. Therefore, after the channels are blocked, the access network device adaptively determines the target power increase value based on the target key characteristic of the target cell, and increase, based on the determined target power increase value, the transmit power of the access network device corresponding to the target cell or the target user, so that spectral efficiency and cell coverage is improved, and a cell coverage loss and a cell capacity loss caused by channel shutdown is compensated for. Therefore, based on the solution, the access network device obtains a better energy-saving effect while ensuring cell performance.

In at least one embodiment, step 303 includes: The access network device inputs the target key characteristic into an algorithm model in the access network device; and the access network device determines the target power increase value based on an output of the algorithm model.

Because there is a mapping relationship between a key characteristic of a cell and an optimal power increase value, the mapping relationship is represented by using the algorithm model.

In other words, the access network device determines the target power increase value by using the algorithm model based on the target key characteristic of the target cell.

The algorithm model is an artificial intelligence (AI) model. For example, the algorithm model includes but is not limited to any one of the following models: a neural network algorithm based model, a decision tree based model, a linear algorithm based model, a support vector machine (SVM) based model, a Q-table based model, or a deep learning algorithm based model.

Figure 4A:
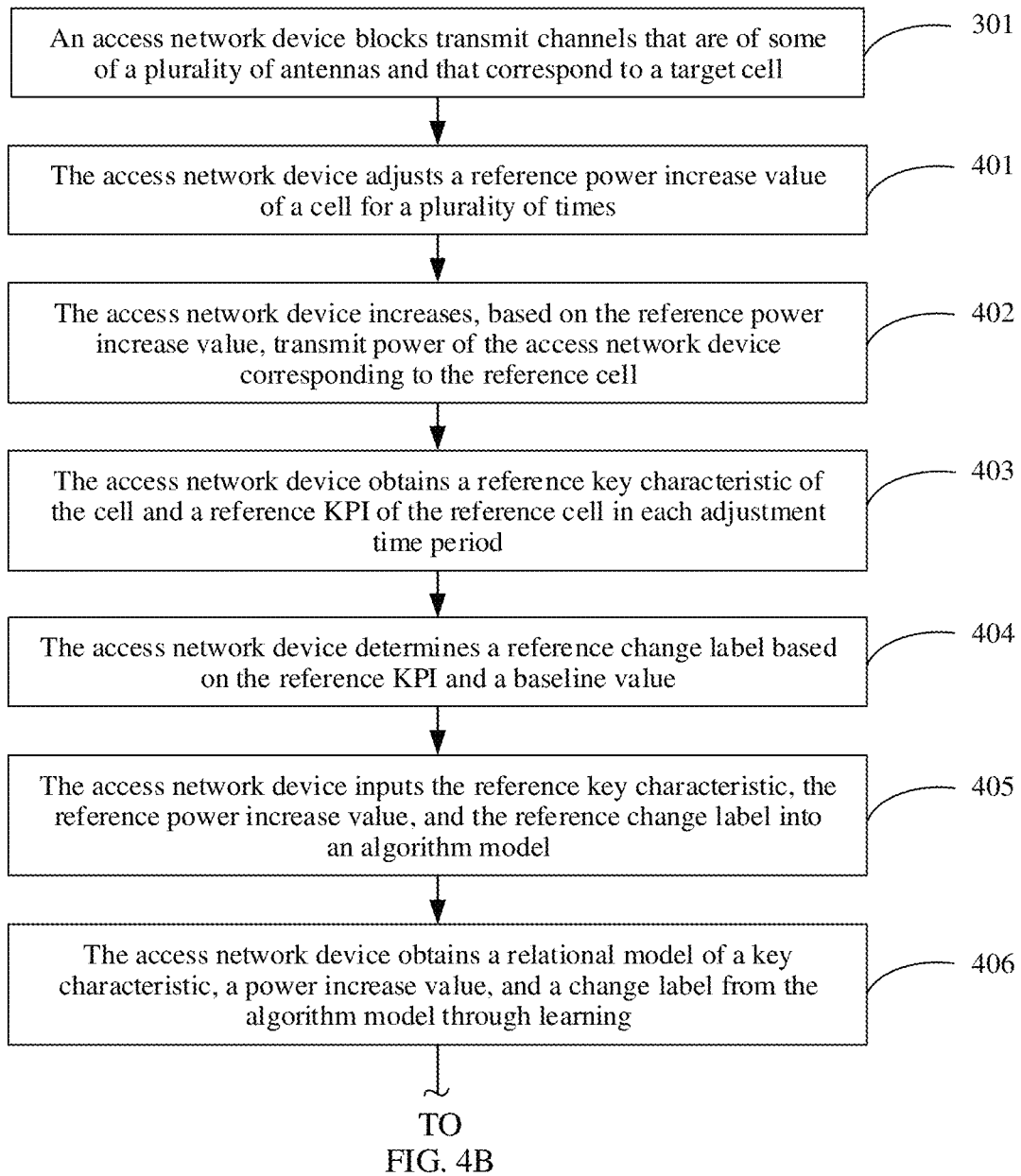
FIG. 4A and FIG. 4B are another flowchart of a power adjustment method according to an embodiment.
Figure 4B:
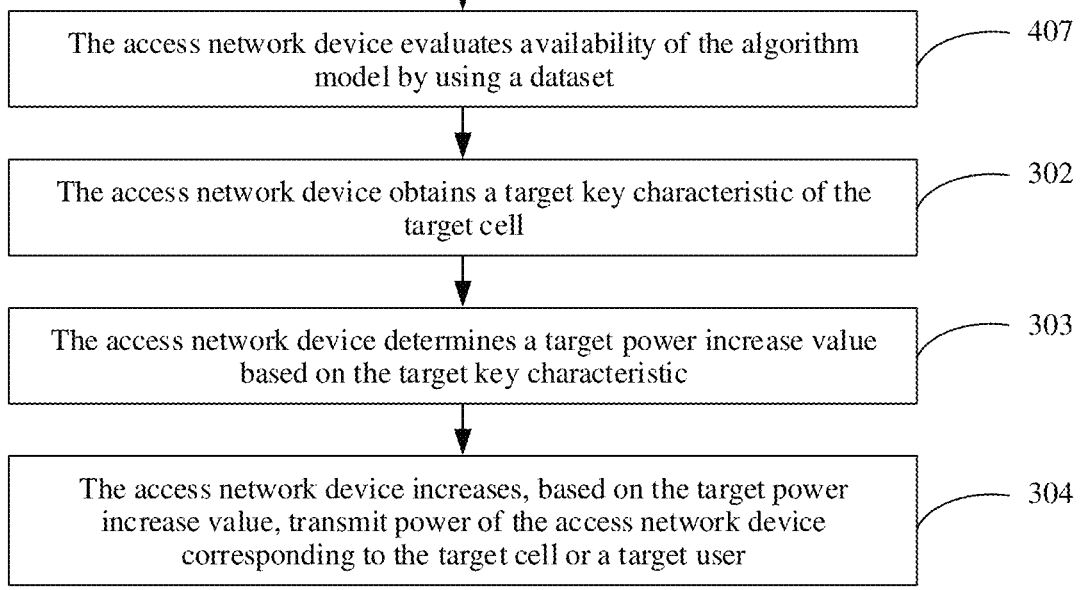

In some embodiments, before obtaining the target key characteristic of the target cell, the access network device trains the algorithm model, to determine, based on the trained algorithm model, an optimal power increase value corresponding to a key characteristic of a current cell. Refer to FIG. 4A and FIG. 4B. Before that the access network device obtains a target key characteristic of the target cell, the training method includes the following steps.

401. The access network device adjusts a reference power increase value of a reference cell for a plurality of times.

In some embodiments, the access network device adjusts a reference power increase value of a reference cell for a plurality of times including: The access network device increases the reference power increase value of the reference cell at an interval of a time period T.

The time period T is a preset duration, and the access network device adjusts the reference power increase value of the reference cell at an interval of the preset duration. For example, the time period T is one of 3 minutes, 5 minutes, 6 minutes, or 10 minutes. A length of the time period T is not limited in this embodiment.

In some other embodiments, the access network device adjusts a reference power increase value of a reference cell for a plurality of times including: The access network device adjusts the reference power increase value of the reference cell at a changing time interval. For example, the access network device adjusts the reference power increase value of the reference cell at an interval of 3 minutes for the first time, then adjusts the reference power increase value of the reference cell at an interval of 5 minutes, and then adjusts the reference power increase value of the reference cell at an interval of 6 minutes. After that, the access network device continues to adjust the reference power increase value of the reference cell at the changing time interval.

For example, the access network device adjusts a power increase value of a cell for a plurality of times including: The access network device decreases the power increase value from a first preset value at a preset step until the power increase value is a second preset value, and then repeats the process.

The first preset value is set by a user, or is determined by the access network device based on a cell status. For example, the first preset value is 5 dB, 6 dB, 7 dB, or 8 dB. Alternatively, the second preset value is set by a user, or is determined by the access network device based on a cell status. For example, the second preset value is one of 0 dB, 1 dB, 2 dB, or 3 dB. Alternatively, the preset step is set by a user, or is determined by the access network device based on a cell status. For example, the preset step is one of 1 dB, or 2 dB. Values of the first preset value, the second preset value, and the preset step are not limited in this embodiment.

For example, in response to the access network device blocking the transmit channels that are of half of the plurality of antennas and that correspond to the target cell, the access network device decreases the power increase value from 6 dB at a preset step of 1 dB until the power increase value is 0 dB, and then repeats the process.

For example, the access network device adjusts a power increase value of a cell for a plurality of times including: The access network device increases the power increase value from the second preset value at the preset step until the power increase value is the first preset value, and then repeats the process.

The manner that the access network device adjusts the power increase value of the cell for the plurality of times is not limited to the foregoing examples, and the manner in which the access network device adjusts the power increase value of the cell for the plurality of times is not limited in this embodiment.

That is, the access network device adjusts the power increase value corresponding to the cell in a manner of decreasing or increasing the power increase value gradually. Subsequently, changes in cell performance caused by different power increase values are analyzed, to seek a power increase value that balances the cell performance and benefits.

402. The access network device increases, based on the reference power increase value, transmit power of the access network device corresponding to the reference cell.

403. The access network device obtains a reference key characteristic of the reference cell and a reference KPI of the reference cell in an adjustment time period.

The reference key characteristic is used to indicate a basic condition of the reference cell. The reference key characteristic includes at least one of reference cell load, a reference cell service volume, or reference cell user distribution. The reference key characteristic is alternatively another key characteristic, and a type of the reference key characteristic is not limited in this embodiment.

The reference KPI is used to indicate a performance indicator of the reference cell at the reference power increase value, and the reference KPI includes at least one of parameters such as a throughput, a call drop rate, or saved energy. For example, the throughput includes an amount of data successfully transferred by the reference cell. The call drop rate includes a probability of unexpected communication interruption of the reference cell in a communication process. The saved energy includes an energy-saving effect of a reference power increase value compared with an energy-saving effect of a preset power increase value. The reference KPI is alternatively another indicator that represents reference cell performance A type of the reference KPI is not limited in this embodiment.

The access network device obtains a reference KPI of the reference cell in an adjustment time period including: The access network device obtains a plurality of reference KPIs of the reference cell in an adjustment time period, so that the access network device subsequently obtains quantized values of the plurality of reference KPIs based on the plurality of reference KPIs that are obtained. A manner in which the access network device obtains the plurality of reference KPIs of the reference cell in an adjustment time period is not limited in this embodiment.

For example, the access network device obtains the plurality of reference KPIs of the reference cell at a fixed time interval in an adjustment time period, so that the access network device subsequently obtains the quantized value of the reference KPIs based on the plurality of reference KPIs that are obtained. For example, in response to the adjustment time period being 3 minutes, the access network device obtains the plurality of reference KPIs of the reference cell at an interval of 10 milliseconds in 3 minutes.

For example, the access network device obtains the plurality of reference KPIs of the reference cell at different time intervals in the adjustment time period.

404. The access network device determines a reference change label based on the reference KPI and a baseline value.

The reference change label is used to indicate whether the power increase value is appropriate.

Step 404 includes: The access network device calculates a comparison value of the quantized value of the reference KPI and the baseline value; in response to the comparison value exceeding a threshold, the access network device determines that the reference change label is a first change label, where the first change label is used to indicate that the reference power increase value is inappropriate; or in response to the comparison value not exceeding the threshold, the access network device determines that the reference change label is a second change label, where the second change label is used to indicate that the reference power increase value is appropriate.

The comparison value of the quantized value of the reference KPI and the baseline value include: a difference between the quantized value of the reference KPI and the baseline value; an absolute value of the difference between the quantized value of the reference KPI and the baseline value; or a ratio of the quantized value of the reference KPI to the baseline value. The comparison value of the quantized value of the reference KPI and the baseline value is not limited to the foregoing form. A form of the comparison value of the quantized value of the reference KPI and the baseline value is not limited in this embodiment.

That is, in response to the comparison value of the quantized value of the reference KPI and the baseline value exceeding the threshold, the reference power increase value cannot well compensate for reference cell performance, the reference cell performance deteriorates, and therefore the reference power increase value is inappropriate. In response to the comparison value of the quantized value of the reference KPI and the baseline value not exceeding the threshold, the reference power increase value compensates for the reference cell performance, deterioration of the reference cell performance falls within an acceptable range, and therefore the reference power increase value is appropriate.

The baseline value is a preset value, and is used to represent a quantized value of a KPI corresponding to a power increase value used by the access network device to compensate for a cell performance loss after the channel is blocked.

For example, in response to the access network device blocking the transmit channels that are of half of the plurality of antennas and that correspond to the target cell, the baseline value is a quantized value of the KPI and the power increase value is 6 dB.

From the foregoing description, in response to the access network device blocking the transmit channels that are of half of the plurality of antennas and that correspond to the target cell, the cell performance loss is compensated for by the access network device increasing the transmit power by 6 dB. In this case, based on the foregoing mentioned fixed increase solution, the access network device increases the transmit power by 6 dB fixedly.

In other words, in response to the access network device blocking the transmit channels that are of half of the plurality of antennas and that correspond to the target cell, the baseline value is the quantized value of the KPI corresponding to the power increase value that compensates for a performance loss of the cell.

For another example, in response to the access network device blocking the transmit channels that are of half of the plurality of antennas and that correspond to the target cell, the baseline value is a quantized value of the KPI and the power increase value is 5 dB. In response to the access network device blocking the transmit channels that are of half of the plurality of antennas and that correspond to the target cell, the baseline value is alternatively another quantized value of the KPI and the power increase value is another power increase value. A value of the baseline value is not limited in this embodiment.

For example, the threshold is one of 1%, 2%, 3%, 5%, or 10% of the baseline value. A value of the threshold is not limited in this embodiment.

For example, the first change label is 0, and the second change label is 1. The first change label and the second change label are different numbers or symbols, and types of the first change label and the second change label are not limited in this embodiment.

405. The access network device inputs the reference key characteristic, the reference power increase value, and the reference change label into the algorithm model.

406. The access network device obtains a relational model of the key characteristic, the power increase value, and the change label from the algorithm model through learning.

That is, the access network device trains the algorithm model by inputting the reference key characteristic, the reference power increase value, and the reference change label into the algorithm model, to obtain the relational model of the key characteristic, the power increase value, and the change label. Subsequently, the target power increase value corresponding to the key characteristic of the target cell is obtained based on the algorithm model.

The output of the algorithm model is the change label. That the access network device determines the target power increase value based on an output of the algorithm model including: The access network device determines a smallest power increase value among power increase values corresponding to the second change label, where the smallest power increase value is the target power increase value.

That is, the access network device determines, as the target power increase value based on the change label output by the algorithm model, a smallest power increase value among power increase values corresponding to the change label that indicates an appropriate power increase value.

The access network device reserves a dataset, where the dataset includes a plurality of groups of reference key characteristics, reference power increase values, and reference change labels that are obtained before the target key characteristic is obtained.

In other words, before the access network device trains the algorithm model by inputting the reference key characteristic, the reference power increase value, and the reference change label into the algorithm model, the access network device reserves some groups of data in the plurality of groups of the reference key characteristics, the reference power increase values, and the reference change labels. For example, the access network device obtains 100 groups of reference key characteristics, reference power increase values, and reference change labels in total, and reserves 10 groups of reference key characteristics, reference power increase values, and reference change labels as the dataset.

The foregoing dataset is used to subsequently evaluate availability of the algorithm model. Therefore, after step 406, the method further includes the following step.

407. The access network device evaluates the availability of the algorithm model by using the dataset.

In other words, the access network device reserves, as the dataset, some of the plurality of groups of reference key characteristics, reference power increase values, and reference change labels that are obtained before the target key characteristic is obtained, and evaluate the availability of the algorithm model based on the dataset.

The availability of the algorithm model indicates that the algorithm model is available, or the availability of the algorithm model is further an indication of accuracy of the algorithm model.

For example, the access network device evaluates availability of the algorithm model by using the dataset including: The access network device calculates the accuracy of the algorithm model by using the dataset. In response to the accuracy being greater than or equal to a preset value, the algorithm model is available, and modeling is successful. Alternatively, in response to the accuracy being less than the preset value, the algorithm model is unavailable, and the modeling fails. A manner in which the access network device evaluates the availability of the algorithm model by using the dataset is not limited thereto. A manner in which the access network device evaluates the availability of the algorithm model by using the dataset is not limited in this embodiment.

In response to the modeling failing, the access network device performs step 401 to step 407 again to retrain the algorithm model. The access network device cyclically performs the process until the algorithm model is successfully modeled. After the modeling is successful, the access network device performs step 302 to step 304, to determine the target power increase value based on the target key characteristic by using the algorithm model. The access network device increases, based on the target power increase value, the transmit power of the access network device corresponding to the target cell or the target user.

For example, the preset value is one of be 80%, 85%, 90%, 92%, or 98%. A value of the preset value is not limited in this embodiment.

Step 401 to step 407 describe a method for training the algorithm model and evaluating the availability of the algorithm model by using the reserved dataset. In the method, the algorithm model is first trained, and then the dataset is used to monitor whether the constructed algorithm model is successful, so that the algorithm model that is successfully modeled is finally obtained. Therefore, the method for constructing the algorithm model described in step 401 to step 407 is referred to as a supervised machine learning algorithm.

In some other embodiments, the algorithm model includes a correspondence among a plurality of groups of key characteristics and power increase values of cells, and benefits obtained in response to the access network device using the power increase values. The algorithm model is used to learn a relational model between a key characteristic and a first power increase value, and the first power increase value is a power increase value that has a largest benefit and that corresponds to the key characteristic. The first power increase value is also referred to as an optimal power increase value.

In other words, the access network device determines, based on the algorithm model, the first power increase value that corresponds to the target key characteristic of the target cell and that has a largest benefit, that is, the target power increase value.

Figure 5:
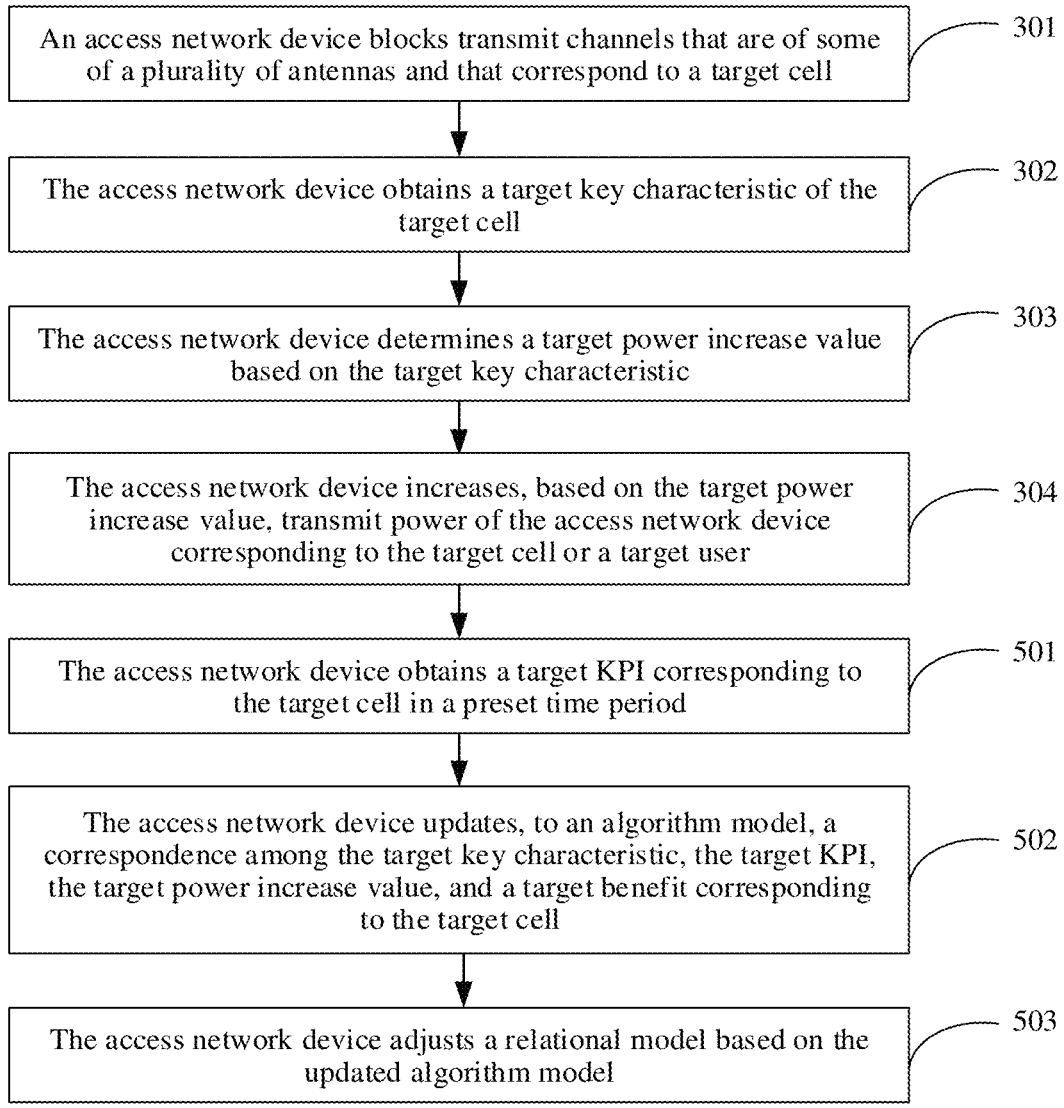
FIG. 5 is another flowchart of a power adjustment method according to an embodiment.

Refer to FIG. 5. After that the access network device increases, based on the target power increase value determined by using the algorithm model, the transmit power of the target resource block RB, that is, after step 304, the method further includes the following steps.

501. The access network device obtains a target KPI corresponding to the target cell in a preset time period.

The preset time period is one of 3 minutes, 5 minutes, 6 minutes, 10 minutes, or the like. A length of the preset time period is not limited in this embodiment.

The target KPI includes at least one of a throughput, a call drop rate, or saved energy. The target KPI is alternatively another indicator that represents cell performance A type of the target KPI is not limited in this embodiment.

The access network device obtains a target KPI corresponding to the target cell in a preset time period including: The access network device obtains a plurality of target KPIs of the target cell in the preset time period, so that the access network device subsequently obtains a quantized value of the target KPIs based on the plurality of target KPIs that are obtained. A manner in which the access network device obtains the plurality of target KPIs of the target cell in the preset time period is not limited in this embodiment.

For example, the access network device obtains the plurality of target KPIs of the target cell at a fixed interval in the preset time period, so that the access network device subsequently obtains the quantized value of the target KPIs based on the plurality of target KPIs that are obtained. For example, in response to the preset time period being 5 minutes, the access network device obtains the plurality of target KPIs of the target cell at an interval of 100 milliseconds in 5 minutes. For example, the access network device obtains the plurality of target KPIs of the target cell at different intervals in the preset time period.

502. The access network device updates, to the algorithm model, a correspondence among the target key characteristic, the target KPI, the target power increase value, and a target benefit corresponding to the target cell.

The target benefit is a benefit obtained based on the target KPI, the target power increase value, and a baseline value.

The algorithm model includes a repository, and step 502 includes: The access network device updates, to the repository, the correspondence among the target key characteristic, the target KPI, the target power increase value, and the target benefit corresponding to the target cell.

In some embodiments, in response to a comparison value of the quantized value of the target KPI and the baseline value not exceeding a threshold, the benefit is a difference between a preset power increase value and the target power increase value.

The quantized value of the target KPI is a value obtained by quantizing the target KPI. For example, the quantized value of the target KPI is a largest value, a smallest value, or an average value of the target KPI. A type of the quantized value of the target KPI is not limited in this embodiment.

The baseline value is a preset value, and is used to represent a quantized value of a KPI corresponding to a power increase value used by the access network device to compensate for a cell performance loss after the channel is blocked. A value of the baseline value is not limited in this embodiment.

The comparison value of the quantized value of the target KPI and the baseline value include: a difference between the quantized value of the target KPI and the baseline value; an absolute value of the difference between the quantized value of the target KPI and the baseline value; or a ratio of the quantized value of the target KPI to the baseline value. The comparison value of the quantized value of the target KPI and the baseline value is not limited to the foregoing form. A form of the comparison value of the quantized value of the target KPI and the baseline value is not limited in this embodiment.

For example, in response to the access network device blocking the transmit channels that are of half of the plurality of antennas and that correspond to the target cell, the baseline value is an average value of KPIs and the power increase value is 6 dB. It In response to the access network device blocking the transmit channels that are of half of the plurality of antennas and that correspond to the target cell, the baseline value is alternatively a quantized value of KPIs and the power increase value is 4 dB, 5 dB, 7 dB, or 8 dB.

For example, the threshold is one of 1%, 2%, 3%, 5%, or 10% of the baseline value. A value of the threshold is not limited in this embodiment, and a user selects the value based on at least one embodiment described herein.

The preset power increase value is a power increase value preset by the access network device or a power increase value defined by the user. For example, the preset power increase value is one of 0 dB, 1 dB, 2 dB, 3 dB, 4 dB, 5 dB, 6 dB, or 7 dB.

In response to the comparison value of the quantized value of the target KPI and the baseline value exceeding the threshold, the quantized value of the target KPI is determined to have deviated from the baseline value. Consequently, performance of the target cell has deteriorated beyond a preset range. In this case, the power increase value cannot compensate for the cell performance loss after the channel is blocked. Therefore, the power increase value is not optimal. In other words, in response to the comparison value of the quantized value of the target KPI and the baseline value exceeding the threshold, the power increase value cannot compensate for the cell performance loss after the channel is blocked. In response to the power increase value being greater than or less than the preset power increase value, the current power increase value is not optimal. In response to the comparison value of the quantized value of the target KPI and the baseline value not exceeding the threshold, the performance of the target cell is determined to have not deteriorated beyond the preset range. In this case, the power increase value compensates for the cell performance loss after the channel is blocked, and the benefit is a comparison value of the preset power increase value and the target power increase value. For example, in response to the comparison value of the quantized value of the target KPI and the baseline value not exceeding the threshold, the preset power increase value is 6 dB, and the target power increase value is 5 dB. In this case, the benefit is 1 dB.

In other words, in response to the comparison value of the quantized value of the target KPI and the baseline value not exceeding the threshold, the target power increase value does not meet a performance compensation used by the cell, and saves energy.

503. The access network device adjusts a relational model based on the updated algorithm model.

After updating the correspondence among the target key characteristic, the target KPI, the target power increase value, and the target benefit corresponding to the target cell to the algorithm model, the access network device adjusts the relational model based on the updated algorithm model. Therefore, the access network device inputs a key characteristic of the target cell into the algorithm model, and the target power increase value is obtained. Then, the access network device increases the transmit power by using the power increase value, and obtains the target KPI corresponding to the target cell in a time period T. Then, the access network device updates, to the algorithm model, the correspondence among the target key characteristic, the target KPI, the target power increase value, and the obtained target benefit corresponding to the target cell, and adjust the relational model between the key characteristic and the first power increase value based on the updated algorithm model. Therefore, the algorithm model is applied, and the algorithm model obtains updated feedback, so that the algorithm model adjusts and optimizes the relational model. In response to the algorithm model being applied next time, the access network device determines an optimal power increase value based on the relational model and the algorithm model that have been recently optimized.

In other words, the access network device determines, by using the algorithm model, the target power increase value corresponding to the key characteristic of the target cell, updates, to the algorithm model, the correspondence among the target key characteristic, the target KPI, the target power increase value, and the target benefit corresponding to the target cell, and adjusts the relational model. In this way, the access network device updates the algorithm model and adjusts the relational model. Therefore, the power increase value determined based on the algorithm model is more accurate.

Step 501 to step 503 describe a method for updating the algorithm model and adjusting the relational model based on the key characteristic of the cell and the KPI, the power increase value, and the benefit corresponding to the key characteristic of the cell. Therefore, the method for updating the algorithm model described in step 501 to step 503 is referred to as a reinforcement learning algorithm.

Figure 6:
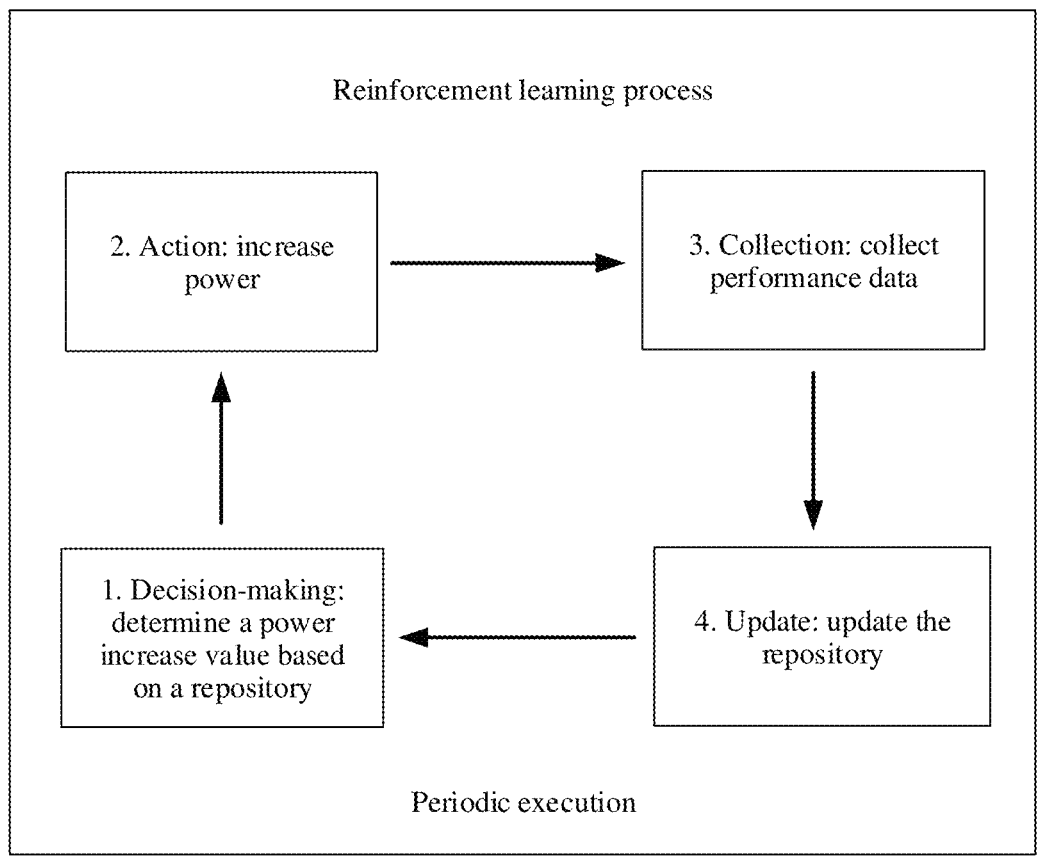
FIG. 6 is another flowchart of a power adjustment method according to an embodiment.

The reinforcement learning algorithm is also described by using a flowchart shown in FIG. 6. First, after the access network device inputs a key characteristic of the target cell into the algorithm model, the access network device determines the target power increase value based on the repository in the algorithm model. This step is referred to as a decision-making step. Then, the access network device increases, by using the power increase value, the transmit power of the access network device corresponding to the target cell or the target user. This step is referred to as an action step. The access network device collects the KPI of the target cell after increasing the transmit power of the target resource block RB. This step is referred to as a collection step. Finally, the access network device updates, to the algorithm model, the correspondence among the target key characteristic, the target KPI, the target power increase value, and the target benefit corresponding to the target cell, and adjusts the relational model between the key characteristic and the first power increase value based on the updated algorithm model. This step is referred to as an update step. in response to obtaining a key characteristic of another target cell next time, the access network device determines, based on the decision-making step, another target power increase value based on the updated relational model and algorithm model, so that the access network device performs a learning process again to update the repository of the algorithm model. Therefore, based on such a reinforcement learning process with continuous feedbacks, the algorithm model obtained by using the reinforcement algorithm represents a relationship between a key characteristic and an optimal power increase value, to obtain an optimal power increase policy.

In at least one embodiment, the repository is empty because the repository is not established for the reinforcement learning algorithm in an initial state. Therefore, in the initial state, the access network device presets or randomly selects a power increase value to increase the power. For example, in the initial state, in response to the access network device blocking the transmit channels that are of half of the plurality of antennas and that correspond to the target cell, the decision-making step is similar to the supervised machine learning algorithm, and the access network device adjusts a power increase value of a cell for a plurality of times including: The access network device decreases the power increase value from 6 dB at a preset step until the power increase value is 0 dB, and then repeats the process. Then, in response to the repository accumulating a correspondence among a plurality of groups of key characteristics and power increase values of a cell, and benefits obtained in response to the access network device using the power increase values, a relational model between the key characteristic of the cell and the optimal power increase value has been preliminarily constructed. In this case, the optimal power increase value is determined and the repository is updated based on the procedure shown in FIG. 6.

Compared with what the access network device has done in the supervised machine learning algorithm described in step 401 to step 407, the access network device does not determine the reference change label based on the reference KPI and the baseline value in the reinforcement learning algorithm, and does not use the reserved dataset to evaluate the availability of the algorithm model after training the algorithm model. Therefore, a modeling process of the reinforcement learning algorithm is simple, a change label is not set, and the reinforcement learning algorithm is more applicable to model construction in a scenario that the use of the change label for labeling is difficult.

In addition, for a cell whose key characteristic changes drastically, the reference key characteristics of the cell obtained by the access network device for a plurality of times differ greatly, and a KPI of the cell is affected by the reference key characteristic. Therefore, for the cell whose key characteristic changes drastically, even setting the access network device at a same power increase value, the reference key characteristics of the cells obtained for the plurality of times differ greatly. Therefore, there is a large error in response to the change label being calculated based on a preset baseline value. However, in the reinforcement learning algorithm, the access network device does not determine the reference change label based on the reference KPI and the baseline value. In addition, the algorithm model obtained based on the reinforcement learning algorithm is strengthened as the algorithm model is updated. Therefore, compared with the supervised learning algorithm, the reinforcement learning algorithm is more suitable for a cell in which a characteristic changes greatly.

The access network device performs the foregoing functions based on a corresponding hardware and/or software module for performing a function. Algorithm steps in examples described with reference to the embodiments disclosed herein are implemented in a form of hardware or a combination of hardware and computer software. Whether a function is performed by hardware or hardware driven by computer software depends on particular applications and design constraints of the technical solutions. In at least one embodiment different methods are used to implement the described functions.

In this embodiment, division into function modules is performed on the access network device based on the foregoing method examples. For example, a function module is obtained through division based on a corresponding function, or two or more functions is integrated into one processing module. The integrated module is implemented in a form of hardware. In this embodiment, division into modules is an example and is a logical function division. In at least one embodiment there is another division manner.

Figure 7:
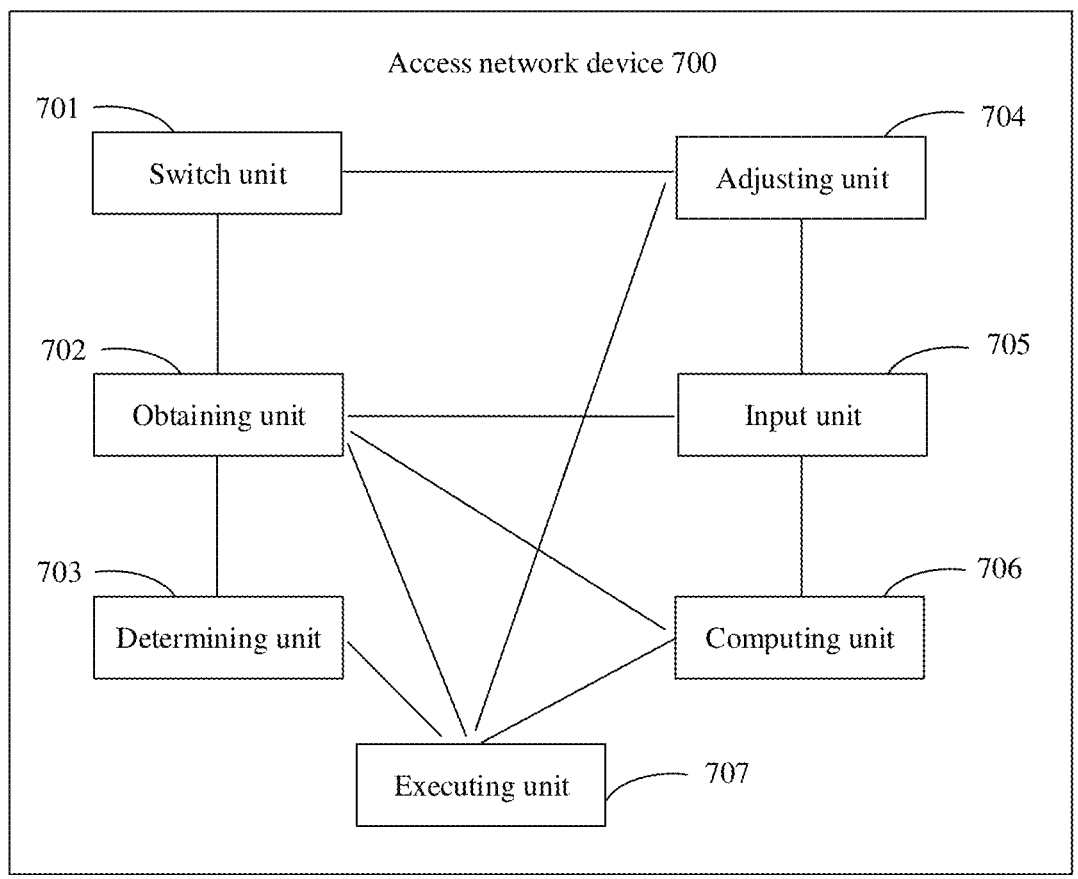
FIG. 7 is another schematic diagram of a structure of an access network device according to an embodiment.

A function module is obtained through division based on a corresponding function, FIG. 7 is a possible schematic composition diagram of an access network device 700 in the foregoing embodiment. As shown in FIG. 7, the access network device 700 includes a switch unit 701, an obtaining unit 702, a determining unit 703, an adjusting unit 704, an input unit 705, a computing unit 706, and an executing unit 707.

The switch unit 701 is configured to support the access network device 700 in performing step 301 and the like, and/or is configured to perform another process of the technology described herein.

The obtaining unit 702 is configured to support the access network device 700 in performing step 302, step 403, step 501, and the like, and/or is configured to perform another process of the technology described herein.

The determining unit 703 is configured to support the access network device 700 in performing step 303, step 404, and the like, and/or is configured to perform another process of the technology described herein.

The adjusting unit 704 is configured to support the access network device 700 in performing step 401, step 503, and the like, and/or is configured to perform another process of the technology described herein.

The input unit 705 is configured to support the access network device 700 in performing step 405, step 502, and the like, and/or is configured to perform another process of the technology described herein.

The computing unit 706 is configured to support the access network device 700 in performing step 406, step 407, and the like, and/or is configured to perform another process of the technology described herein.

The executing unit 707 is configured to support the access network device 700 in performing step 304, step 402, and the like, and/or is configured to perform another process of the technology described herein.

Related content of the steps in the foregoing method embodiments is cited in function descriptions of corresponding function modules. Details are not described herein again.

The access network device 700 provided in this embodiment is configured to perform the foregoing power adjustment method, and therefore achieves a same effect as the foregoing method.

in response to an integrated unit being used, the access network device 700 includes a processing module, a storage module, and a communication module. The processing module is configured to control and manage an action of the access network device 700. For example, the processing module is configured to support the access network device 700 in performing the steps performed by the switch unit 701, the obtaining unit 702, the determining unit 703, the adjusting unit 704, the input unit 705, the computing unit 706, and the executing unit 707. The storage module is configured to support the access network device 700 in storing program code, data, and the like. The communication module is configured to support the access network device 700 in communicating with another device, for example, communicating with a radio access device.

The processing module is a processor or a controller. The processor or the controller implements or executes various example logical blocks, modules, and circuits described with reference to content disclosed in one or more embodiments described herein. Alternatively, the processor is a combination of processors implementing a computing function, for example, a combination of one or more microprocessors, or a combination of a digital signal processor (DSP) and a microprocessor. The storage module is a memory. The communication module is a device that interacts with another access network device, for example, a radio frequency circuit, a Bluetooth chip, or a Wi-Fi chip.

An embodiment further provides a computer-readable storage medium. The computer-readable storage medium stores computer instructions, and in response to the computer instructions running on an access network device, the access network device is enabled to perform the foregoing related method steps, to implement the power adjustment method in the foregoing embodiments.

An embodiment further provides a computer program product. In response to the computer program product running on a computer, the computer is enabled to perform the foregoing related steps, to implement the power adjustment method performed by an access network device in the foregoing embodiments.

In addition, an embodiment further provides an apparatus. The apparatus is a chip, a component, or a module. The apparatus includes a processor and a memory that are connected together. The memory is configured to store computer-executable instructions. In response to the apparatus running, the processor executes the computer-executable instructions stored in the memory, to enable the chip to perform the power adjustment method performed by an access network device in the foregoing method embodiments.

The access network device, the computer-readable storage medium, the computer program product, or the chip provided in the embodiments is configured to perform the corresponding method provided above. Therefore, for beneficial effects that are achieved, refer to the beneficial effects in the corresponding method provided above. Details are not described herein again.

Based on the foregoing descriptions of embodiments, a person skilled in the art understand that, for a purpose of convenient and brief descriptions, division into the foregoing function modules is used as an example for description. The foregoing functions are allocated to different function modules based on use. That is, an inner structure of the apparatus is divided into different function modules, to implement all or some of the functions described above.

In the several embodiments provided in this application, the disclosed apparatuses and methods are implemented in other manners. For example, the described apparatus embodiment is an example. For example, division into the modules or units is a logical function division. In at least one embodiment there is another division manner. For example, a plurality of units or components are combined or integrated into another apparatus, or some features are ignored or not performed. In addition, the displayed or discussed mutual couplings or direct couplings or communication connections is implemented through some interfaces, and the indirect couplings or communication connections between apparatuses or units are implemented in an electronic form, a mechanical form, or another form.

In at least one embodiment, the units are separate components and are physically separate or are not physically separated, and components displayed as units are one or more physical units. That is, the units are located in one place, or are distributed on different places. Some or all of the units are selected based on one or more of the objectives of the embodiments.

In addition, function units in embodiments are integrated into one processing unit, or the units exist alone physically, or two or more units are integrated into one unit. The integrated unit is implemented in a form of hardware, or is implemented in a form of a software function unit.

In at least one embodiment, the integrated unit is in the form of the software function unit and sold or used as an independent product, the integrated unit is stored in a readable storage medium. Based on such an understanding, the technical solutions of embodiments described herein, or the part contributing to the technology, or all or some of the technical solutions include a form of a software product. The software product is stored in a storage medium, and includes several instructions for instructing a device (which in at least one embodiment is a single-chip microcomputer, a chip, or the like) or a processor to perform all or some of the steps of the methods in embodiments. The foregoing storage medium includes any medium that stores program code, such as a USB flash drive, a removable hard disk, a read-only memory (ROM), a random access memory (RAM), a magnetic disk, or an optical disc.

The foregoing descriptions describe at least one embodiment, but are not intended to limit the protection scope of at least one embodiment described herein. Any variation or replacement readily figured out by a person skilled in the art in the technical scope disclosed shall fall within the protection scope of at least one embodiment. Therefore, the protection scope of embodiments described herein shall be subject to the protection scope of the claims.

What is claimed is:

1. A power adjustment method, wherein the method comprises:
   blocking, by an access network device, at least one transmit channel of a plurality of antennas and that correspond to a target cell;
   obtaining, by the access network device, a target key characteristic of the target cell;
   determining, by the access network device, a target power increase value based on the target key characteristic; and
   increasing, by the access network device based on the target power increase value, a transmit power of the access network device corresponding to the target cell or a target user.

2. The method according to claim 1, wherein the determining, by the access network device, a target power increase value based on the target key characteristic includes:
   inputting, by the access network device, the target key characteristic into an algorithm model in the access network device; and
   determining, by the access network device, the target power increase value based on an output of the algorithm model.

3. The method according to claim 2, wherein before the obtaining, by the access network device, the target key characteristic of the target cell, the method further comprises:
   adjusting, by the access network device, a reference power increase value of a reference cell for a plurality of times;
   increasing, by the access network device based on the reference power increase value, transmit power of the access network device corresponding to the reference cell;

obtaining, by the access network device, a reference key characteristic of the reference cell and a reference key performance indicator KPI of the reference cell in an adjustment time period;

determining, by the access network device, a reference change label based on the reference KPI and a baseline value, wherein the reference change label indicates the reference power increase value is appropriate;

inputting, by the access network device, the reference key characteristic, the reference power increase value, and the reference change label into the algorithm model; and obtaining, by the access network device, a relational model of a key characteristic, the reference power increase value, and a change label from the algorithm model through learning.

4. The method according to claim 3, wherein the access network device reserves a dataset, the dataset including a plurality of groups of reference key characteristics, reference power increase values, and reference change labels that are obtained before the target key characteristic is obtained; and after the obtaining, by the access network device, the relational model of the key reference characteristic, the reference power increase value, and the change label from the algorithm model through training, the method further comprises:

evaluating, by the access network device, availability of the algorithm model by using the dataset.

5. The method according to claim 3, wherein the determining, by the access network device, the reference change label based on the reference KPI and the baseline value includes:

calculating, by the access network device, a comparison value of a quantized value of the reference KPI and the baseline value; and in response to the comparison value exceeding a threshold, determining, by the access network device, that the reference change label is a first change label, wherein the first change label indicates that the reference power increase value is inappropriate; or in response to the comparison value not exceeding the threshold, determining, by the access network device, that the reference change label is a second change label, wherein the second change label indicates that the reference power increase value is appropriate.

6. The method according to claim 5, wherein the output of the algorithm model is the change label, and the determining, by the access network device, the target power increase value based on an output of the algorithm model includes:

determining, by the access network device, a smallest power increase value among the reference power increase values in a dataset corresponding to the second change label, wherein the smallest power increase value is the target power increase value.

7. The method according to claim 2, wherein the access network device reserves a dataset that includes a plurality of groups of reference key characteristics, reference power increase values and reference change labels, and wherein the algorithm model includes a correspondence among the plurality of groups of reference key characteristics and reference power increase values of cells, and benefits obtained in response to the access network device using the reference power increase values, the algorithm model learning a relational model between the target key characteristic and a first power increase value, the first power increase value having a largest benefit and corresponds to the target key characteristic.

8. The method according to claim 7, wherein after the increasing, by the access network device based on the target power increase value, transmit power of the access network device corresponding to the target cell, the method further includes:

obtaining, by the access network device, a target KPI corresponding to the target cell in a preset time period;

updating, by the access network device to the algorithm model, a correspondence among the target key characteristic, the target KPI, the target power increase value, and a target benefit corresponding to the target cell, wherein the target benefit is based on the target KPI, the target power increase value, and a baseline value; and adjusting, by the access network device, the relational model based on the updated algorithm model.

9. The method according to claim 8, wherein in response to a comparison value of a quantized value of the target KPI and the baseline value not exceeding a threshold, the benefit is a difference between a preset power increase value and the target power increase value.

10. The method according to claim 2, wherein the blocking, by the access network device, the at least one transmit channel of that plurality of antennas and that correspond to the target cell including blocking transmit channels that are of half of the plurality of antennas and that correspond to the target cell, and quantizing a value of a KPI of the baseline value in response to the target power increase value being 6 dB.

11. An access network device, comprising:
a processor; and
a memory coupled to the processor, wherein the memory includes instructions that, when executed by the processor causes the processor to perform operations including:
blocking at least one transmit channel of a plurality of antennas and that correspond to a target cell;
obtaining a target key characteristic of the target cell;
determining a target power increase value based on the target key characteristic; and
increasing, based on the target power increase value, a transmit power of the access network device corresponding to the target cell or a target user.

12. The access network device according to claim 11, wherein the determining the target power increase value based on the target key characteristic includes:
inputting the target key characteristic into an algorithm model in the access network device; and
determining the target power increase value based on an output of the algorithm model.

13. The access network device according to claim 12, wherein before the obtaining the target key characteristic of the target cell, the operations further including:
adjusting a reference power increase value of a reference cell for a plurality of times;
increasing, based on the reference power increase value, transmit power of the access network device corresponding to the reference cell;
obtaining a reference key characteristic of the reference cell and a reference key performance indicator KPI of the reference cell in an adjustment time period;

determining a reference change label based on the reference KPI and a baseline value, wherein the reference change label indicates the reference power increase value is appropriate;

inputting the reference key characteristic, the reference power increase value, and the reference change label into the algorithm model; and obtaining a relational model of the reference key characteristic, the reference power increase value, and the reference change label from the algorithm model through learning.

14. The access network device according to claim 13, wherein the access network device reserves a dataset, the dataset including a plurality of groups of reference key characteristics, reference power increase values, and reference change labels that are obtained before the target key characteristic is obtained; and after the obtaining the relational model of the reference key characteristic, the reference power increase value, and the reference change label from the algorithm model through learning, the processor further performs the operations of:

evaluating availability of the algorithm model by using the dataset.

15. The access network device according to claim 13, wherein the determining the reference change label based on the reference KPI and the baseline value includes:

calculating a comparison value of a quantized value of the reference KPI and the baseline value; and in response to the comparison value exceeding a threshold, determining that the reference change label is a first change label, wherein the first change label indicates that the reference power increase value is inappropriate; or in response to the comparison value not exceeding the threshold, determining that the reference change label is a second change label, wherein the second change label indicates that the reference power increase value is appropriate.

16. The access network device according to claim 15, wherein the output of the algorithm model is the change label, and the determining the target power increase value based on an output of the algorithm model includes:

determining a smallest power increase value among the reference power increase values in a dataset corresponding to the second change label, wherein the smallest power increase value is the target power increase value.

17. The access network device according to claim 12, wherein the access network device reserves a dataset that includes a plurality of groups of reference key characteristics, reference power increase values, and reference change labels, and wherein the algorithm model includes a correspondence among the plurality of groups of reference key characteristics and reference power increase values of cells, and benefits obtained in response to the access network device using the reference power increase values, the algorithm model learning a relational model between the target key characteristic and a first power increase value, and the first power increase value has a largest benefit and corresponds to the key characteristic.

18. The access network device according to claim 17, wherein after the increasing, based on the target power increase value, transmit power of the access network device corresponding to the target cell or the target user, the operations further including:

obtaining a target KPI corresponding to the target cell in a preset time period;

updating, to the algorithm model, a correspondence among the target key characteristic, the target KPI, the target power increase value, and a target benefit corresponding to the target cell, wherein the target benefit is based on the target KPI, the target power increase value, and a baseline value; and adjusting the relational model based on the updated algorithm model.

19. The access network device according to claim 18, wherein in response to a comparison value of a quantized value of the target KPI and the baseline value not exceeding a threshold, the benefit is a difference between a preset power increase value and the target power increase value.

20. The access network device according to claim 12, wherein the blocking the at least one transmit channel of the eplurality of antennas and that correspond to the target cell includes blocking the transmit channels that are of half of the plurality of antennas and that correspond to the target cell, and quantizing a value of a KPI of a baseline value in response to the power increase value being 6 dB.

* * * * *